United States Patent [19]

Metz

[11] 4,199,609
[45] Apr. 22, 1980

[54] METHOD FOR PREPARING CHEESE
[75] Inventor: Fred L. Metz, Concord, Ohio
[73] Assignee: Diamond Shamrock Corporation, Dallas, Tex.
[21] Appl. No.: 861,908
[22] Filed: Dec. 19, 1977
[51] Int. Cl.$^2$ ............................................. A23C 19/02
[52] U.S. Cl. ..................................... 426/582; 426/39; 426/580
[58] Field of Search .................. 426/36, 39, 580, 582, 426/583

[56] References Cited

U.S. PATENT DOCUMENTS

| | | | |
|---|---|---|---|
| 2,478,618 | 8/1949 | Armstrong et al. | 426/551 |
| 2,982,654 | 5/1961 | Hammond et al. | 426/582 |
| 3,170,795 | 2/1965 | Andre | 426/551 |
| 3,172,767 | 3/1965 | Foster, Jr. et al. | 426/39 |
| 3,275,451 | 9/1966 | Holstein | 426/551 X |
| 3,406,076 | 10/1968 | Little | 426/39 |
| 3,620,768 | 11/1971 | Corbin, Jr. | 426/39 |
| 3,882,250 | 5/1975 | Loter et al. | 426/36 |

FOREIGN PATENT DOCUMENTS 1247415 9/1971 United Kingdom.

*Primary Examiner*—David M. Naff
*Attorney, Agent, or Firm*—Helen P. Brush

[57] ABSTRACT

Dairy products such as cottage cheese, bakers' cheese and cream cheese are prepared by adding an acidogen system containing an alihatic $C_{2-8}$ dione and hydrogen peroxide to milk of varying butterfat and milk solids content. Acid necessary for acidification is generated by the oxidation of the dione "in situ". Curd formed by case in coagulation is then further processed to make various cheeses.

14 Claims, No Drawings

METHOD FOR PREPARING CHEESE

BACKGROUND OF THE INVENTION

It has long been the practice in the art to prepare acidified dairy products, as for example, cottage cheese, by inoculating milk with mixed cultures of lactic acid-forming bacteria which ferment the milk until the desired acidity is achieved. Dairy products obtained commercially by this process are known as cultured products. The word "cultured" is used generically to describe any dairy product acidified by a process involving the use of bacteria in one of the processing steps. Preparing cultured dairy products using acid-forming bacteria cultures has numerous shortcomings. Fermentation by a mixed culture of bacteria is difficult to control accurately, and there are occasions when acid development is too high or too low, resulting in a product with poor flavor and/or variation in quality and shelf life from day to day. Additionally, the fermentation process has required a long time period, e.g., up to 24 hours, from start to finish, thereby monopolizing important equipment and making the process nonamenable to continuous operation and automation techniques.

More recently, various processes for preparing cheese from chemically acidified milk without using bacterial fermentation have become known and practiced in the art. For example, U.S. Pat. No. 2,982,654 (Hammond et al) teaches a process for making cheese curd wherein an acidogen is added to milk in conjunction with a proteolytic enzyme. However, in this process, the use of acidogen alone, without first acidifying the milk, requires a long period of time to form a curd, thereby making it undesirable. U.S. Pat. No. 3,172,767 (Foster et al) teaches a process in which milk is acidified at 4°–5° C. and is then heated to 29°–82° C. whereupon a proteolytic enzyme is added to produce a sweet cheese curd. This process, however, requires additional equipment for cooling the milk and does not produce an acid cheese curd. U.S. Pat. No. 3,406,076 (Little) teaches a process in which milk must be refrigerated before addition of acidogen, thereby requiring additional equipment. U.S. Pat. No. 3,620,768 (Corbin) teaches the acidification of cold milk. British Pat. No. 1,247,415 (Battelle) also teaches the acidification of cold milk, and moreover states at page 3, lines 3 through 7, that: "It is well known that when milk is acidified at a temperature of about 70° F. (21° C.) to a pH of about 5.20 or below, it coagulates almost instantly into a granular water coagulation, totally unfit for making cheese." This disclosure is supported generally in "Principles of Dairy Chemistry" by Robert Jenness and Stuart Patton (John Wiley & Sons, New York, 1959) at page 310, where it is stated" . . . the sensitivity of casein to coagulation by heat is enormously increased by decreasing the pH a few tenths of a unit below the normal value for milk." In the processes of the above patents, use of low temperatures greatly increases processing costs in that longer time cycles and larger quantities of reagents, e.g., acids, proteolytic enzymes and the like, are required. Conversely, heating of acidified milk in special equipment is time consuming and unsatisfactory since the milk must be heated in a quiescent state which requires special and complex heating equipment. More recently, as set forth in U.S. Pat. No. 3,882,250 (Loter et al), a process has been developed which involves acidifying milk at a temperature of about 15°–30° C. and then forming cheese curd by adding acidogen and proteolytic enzyme to the warm acidified milk as it is maintained in a quiescent state.

SUMMARY OF THE INVENTION

This invention comprises a further improved process whereby acidified dairy products such as cottage cheese, baker's cheese, cream cheese and the like can be produced rapidly and economically using standard equipment without employing bacterial fermentation or other time consuming steps. It involves the direct acidification of milk using as a sole acidifying agent, i.e., the acidogen, any one of a group of selected diones and hydrogen peroxide in combination. The use of a coagulation aid such as a proteolytic enzyme is not necessary in this process, nor is it necessary to adjust the pH of the milk with a food-grade free acid, e.g., lactic acid, phosphoric acid, citric acid or the like, prior to addition of the acidogen as has usually been practiced heretofore. The acidogen system of this invention, in itself, serves to regulate the progress of the reaction as indicated by the controlled lowering of the milk pH, whereby cheese curd products of optimum quality are consistently prepared.

DESCRIPTION OF THE PREFERRED EMBODIMENTS

This invention can be used to manufacture cottage cheese, bakers' cheese, and creamed acid-curd cheese such as cream cheese, Neufchatel cheese and the like from milk. By "milk" is meant fresh skim milk, skim milk having about 1–4 percent by weight or more of added nonfat milk solids (NFMS), whole milk, milk-cream mixtures, half milk and half cream, reconstituted condensed milk, reconstituted milk powder and the like. Used generically in the present invention, the term "milk" is intended to include low, medium and high butterfat milk or cream having as much as 20 percent butterfat.

As state previously, the process of this invention comprises the acidification of milk to its protein coagulation point by an acid which is generated therein from an acidogen. As used herein in the specification and claims the terms "acidogen," "acidogen system" and "chemical acidogen" are each intended to refer to one or more substances which, when added to milk, will slowly liberate an acid capable of coagulating milk casein, said substance or substances being soluble in but non-reactive to milk.

The acidogen system of this invention is a combination of at least one of a selected group of diones and hydrogen peroxide ($H_2O_2$). The acid necessary for the desired acidification is generated by the oxidation of the dione "in situ." Specifically, the diones used are acylic and cyclic aliphatic compounds containing from 2 to 8 carbon atoms per molecule, and wherein the carbonyl groups are vicinal to each other. These diones conform to one of the following structures:

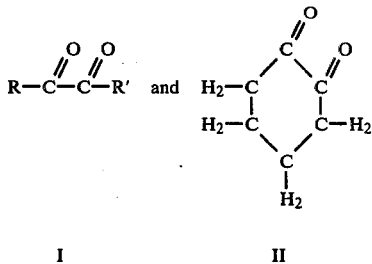

I      II wherein R is hydrogen or $C_{1-2}$ alkyl; and R' is hydrogen or $C_{1-4}$ alkyl. Acyclic diones which are useful include ethanedial, more commonly designated in the art as glyoxal; pyruvaldehyde; diacetyl; and 2,3-pentanedione. A specific cyclic dione used in this invention is 1,2-cyclohexanedione. Glyoxal is presently preferred due to its ready availability and low cost, as well as its particular efficiency in effecting the acidification reaction.

In general, the acidification process may be carried out at a temperature of 4°–40° C., with temperatures of 25°–40° C. preferred, and temperatures of 28°–35° C. being most preferable. It is to be understood, of course, that at lower temperatures within this range, acidification of the milk to curd formation will proceed at slower rates than when the higher temperatures are used.

The acidogen components may be added to the cold milk and the resulting mixture heated to the selected reaction temperature. Alternatively, the milk may be heated to the desired temperature prior to adding the acidogen thereto. Incorporation of the acidogen is effected with gentle agitation of the milk, vigorous agitation generally being unnecessary.

Throughout the acidification process, the pH of the milk is progressively lowered slowly from 6.5–6.8, for example, to the coagulation stage (usually at a pH below 5.0) by the acid generated from the concomitant oxidation of the dione component. As an example, when glyoxal is employed in combination with hydrogen peroxide as the acidogen system, the glyoxal (or ethanedial) is oxidized to formic acid. Using pyruvaldehyde, mixed acetic and formic acids are deemed to be the major products. By using the acidogen system of this invention, the pH of the milk is lowered at a controlled rate whereby homogeneous protein coagulation to stable curd is assured. No other acidulants as are used in the prior art, e.g., food-grade acids, or coagulation aids such as proteolytic enzymes, etc., need be employed herein to effect the desired coagulation. Accordingly, it can be easily recognized by those skilled in the art that the process of this invention provides definite advantages over prior art processes wherein the use of acids and the like may present problems particularly with respect to acid whey utilization and/or disposal.

However, when whey disposal is not a problem or when a more expensive dione component is to be employed and lower process costs are desired, it is sometimes advantageous to add a good-grade acid, e.g., phosphoric, citric, lactic or tartaric acid, to the milk prior to adding the acidogen. Accordingly, use of a food-grade acid in conjunction with the acidogen system herein does not depart from the scope of this invention. Depending upon the milk temperature, the pH of the milk may be lowered to 5.0–5.3, for example, through acid addition, without coagulating the milk protein. However, it should be remembered that milk coagulates at varying degrees of acidity (pH), depending upon its temperature. Therefore, care must always be taken to avoid incorporating acid in amounts which would lower the pH of the milk to its coagulation point prematurely.

When using an acidifying acid in the manner described hereinabove, it is likewise possible to prepare a mixture of the acid and dione component or a mixture of the acid and $H_2O_2$, sometime prior to carrying out the acidification process. This mixture will then be readily available for addition to milk in a requisite amount. The acidification process may subsequently be carried out by merely adding the other component of the acidogen system.

Depending upon the selected acidification reaction temperature, the initial temperature of the milk, the molecular weight of the particular dione component to be used, and the percentage of milk solids in the milk, from about 0.05 parts by weight to 0.50 parts by weight of dione in combination with from about 0.10 parts by weight to 0.50 parts by weight of hydrogen peroxide per 100 parts by weight of the milk generally will provide the desired acidification rate. If likewise employing a preacidifying acid, lesser amounts of the acidogen components will be needed to effect the desired coagulation. When conducting the acidification at a temperature of 28°–35° C. in accordance with presently preferred practice herein, from about 0.10 to 0.20 parts by weight of dione and from 0.10 to 0.30 parts by weight of hydrogen peroxide per 100 parts by weight of milk, generally is satisfactory.

After mixing, the milk-acidogen combination is maintained at the reaction temperature, with no agitation until cuttable curd is obtained. By varying, e.g., the reaction temperature and the concentration of the acidogen system, the time necessary to obtain the curd will vary from about 30 minutes to 24 hours. In presently preferred embodiments, i.e., a reaction temperature of 28°–35° C., the reaction is completed typically in 60–120 minutes.

Upon completion of the reaction, the cheese curd product is cut and cooked in a conventional manner. It may be cut into large (¾-inch, ⅝-inch, ½-inch) or small (⅜-inch or ¼-inch) cubes. The cooking rate in the process of this invention is usually faster than the cooking rate in a cultured process. Draining and washing of the cooked curd can be carried out using standard cheese making procedures.

To make cottage cheese, the cheese curd is processed with the additional steps of: (1) cutting the curd into cubes, (2) expressing the whey from the curd, (3) cooking and stirring the curd for from about 30 minutes to about 90 minutes at a temperature from about 38° C. to about 65° C., and (4) finally washing and draining the curd. Dressing, i.e., cream, and salt are added to the washed curd to provide the type of cottage cheese desired, freshness, delicacy of flavor and tenderness of body being highly regarded characteristics of the commercial product.

To make baker's cheese, the acid cheese curd is processed with the additional steps of breaking up the curd, then bagging the curd and expressing the whey, and finally hanging and draining the curd for about one hour to help express further whey from the curd.

To make Neufchatel cheese or cream cheese, the cheese curd prepared in the process of this invention is processed with the additional sequential steps of cutting or otherwise breaking up the curd, cooking and stirring the curd until the temperature reaches about 55° C. and then continuing cooking for about 15 additional minutes, then cooling the curd to about 15°-20° C., then draining the curd overnight at about 3°-4° C. to obtain a dry, soft curd, then mixing said dry, soft curd with sufficient lactic acid to further reduce the pH of the curd to about 4.60, and finally blending the curd into a smooth, homogeneous cheese mass. In making cream cheese, the original milk should contain enough cream so as to have a fat content of about 10.5 to 11.5 percent. In making Neufchatel cheese, the original milk should contain enough cream so as to have a fat content of about 5 to about 6 percent. Cottage cheese and baker's cheese generally are prepared from skim milk containing up to about 10 percent by weight total solids and less than 1 percent by weight butterfat.

The process of this invention represents an economical method for preparing acidified dairy products such as cottage cheese, bakers' cheese, cream cheese and the like, which process may be carried out either batchwise or in a continuous manner. The cheese products therefrom are consistently of optimum quality and exhibit excellent shelf life characteristics, compared to prior art cultured products. The novel acidogen system of the process provides many advantages to the routineer. It is nontoxic. It is completely miscible with, but nonreactive with milk. By varying the concentration of the dione and peroxide components, the rate of acid production and, hence, the rate at which the pH of milk is lowered to its protein coagulation point is thus easily controlled. The acidogen system of this invention does not decrease the quality of the cheese curd which is produced, nor does it impart any objectionable flavor or odor. Finally, the acidogen components which are presently preferred, i.e., glyoxal and hydrogen peroxide, are both readily available commercially in multimillion pound quantities at moderate cost.

For a fuller understanding of the nature of this invention, reference may be made to the following examples which are given to illustrate the invention and are not to be construed in a limiting sense.

EXAMPLE 1

Forty gallons (157 kg.) of fresh skim milk is charged to a 50-gallon, (190 l.) jacketed cheese vat and heated to 33° C. (90.6° F.) by circulating warm water through the jacket. The pH of the milk is 6.6 and it contains, by weight, 8.8 percent total solids and less than 0.05 percent butterfat. 760 g. of 40% aqueous glyoxal (0.19 parts by weight glyoxal, per 100 parts by weight of the milk) and 1067 g. of 30% hydrogen peroxide (0.20 parts by weight $H_2O_2$, per 100 parts by weight of the milk) are added to the milk. After mixing in the acidogen system, the milk is allowed to set in a quiescent state for two hours and a firm curd is formed. The pH is 4.85. The curd is cut in a conventional manner, and then cooked to a maximum temperature of 55° C. for two hours. The whey is then drained, and the curds are successively washed and drained three times in the usual manner. The pH of the whey is 4.38. The yield of curds is 45 lbs. (20.4 kg.). They are firm and stable, exhibiting color, odor, taste and texture equivalent to curds produced by conventional culture methods.

EXAMPLE 2

This example illustrates the process of the invention employing a foodgrade, free acid in addition to the glyoxal-hydrogen peroxide acidogen system of Example 1.

For this experiment, 45 gallons (176 kg.) of fresh, skim milk at a temperature of 10° C. is charged to a stirred reactor. Phosphoric acid is added to the milk with stirring until the pH of the milk measures 5.45, about 366 g. of 85% acid being used (0.16 parts by weight $H_3PO_4$ per 100 parts by weight of milk).

Forty gallons (157 kg.) of the above partially acidified milk is pumped into the 50-gallon cheese vat described in Example 1 and heated to 33° C. Then 380 g. of 40% glyoxal (0.10 parts by weight glyoxal, per 100 parts by weight of milk) and 1013 g. of 30% hydrogen peroxide (0.19 parts by weight $H_2O_2$ per 100 parts by weight of milk) are added with stirring. The resulting milk mixture is then maintained undisturbed at 33° C. for 150 minutes, during which time satisfactory cuttable curd is formed. This is cut in the usual manner. The pH of the whey is 4.87. Processing of the curd as set forth in Example 1 yields a firm and stable curd, with color, odor and other characteristics like the cheese curd product of Example 1. After standing for 24 hours at room temperature, this curd product has a pH of 4.48.

EXAMPLE 3

Following the procedure as outlined in Example 1, 40 gallons (157 kg.) of skim milk (pH of 6.7) is heated to 31° C. While maintaining the milk at this temperature, 1010 g. of 40% aqueous pyruvaldehyde (0.25 parts by weight pyruvaldehyde per 100 parts by weight of milk) is added with slight agitation, followed by 1050 g. of 30% hydrogen peroxide (0.19 parts by weight $H_2O_2$ per 100 parts by weight of milk). The milk mixture is then maintained undisturbed at 31°-33° C. for 90 minutes while a good, firm curd forms. The pH is 4.90. This is cut, cooked and washed to give cheese curds of good color, odor and texture.

EXAMPLE 4

This example illustrates the use of diacetyl and hydrogen peroxide as the acidogen system of the invention.

In this test, the pH of 45 gallons (176 kg.) of skim milk is adjusted from 6.7 to approximately 5.1 by the controlled addition of 75 percent phosphoric acid with agitation. A total of 908 g. of the acid (about 0.4 parts by weight $H_3PO_4$ per 100 parts by weight of milk) is added.

Forty gallons (157 kg.) of the partially acidified milk is pumped into the 50-gallon cheese vat, heated to 30° C., and 188 g. of food-grade diacetyl and 990 g. of 30 percent hydrogen peroxide are added. These quantities provide 0.12 parts by weight diacetyl and 0.18 parts by weight $H_2O_2$, per 100 parts by weight of milk. While maintaining the milk temperature at 30° C. in a quiescent state, the pH decreases to 4.7 and firm curd is formed. It is cut, cooked and washed. The drained curds have excellent color, odor, taste and texture.

EXAMPLES 5-9

The pH of 500 ml. of refrigerated skim milk is lowered from 6.66 to 5.16 by adding 85 percent phosphoric acid. The partially acidified milk is divided into 100-ml portions. To each portion is added a dione compound as listed in the Table below in the amount indicated, followed by 0.6 g of 30 percent hydrogen peroxide (0.18 parts by weight H₂O₂ per 100 parts by weight of milk). Each milk-acidogen mixture is then heated to 32° C. and maintained at this temperature in a quiescent state until a firm curd forms. The curd is then cut, cooked, washed and drained as previously described. The finished cottage cheese curds have color, odor, taste and texture equivalent to the products of the previous examples.

Results listed in the following Table include the dione components employed, the concentration of dione (parts by weight per 100 parts by weight of milk), the reaction time to cuttable curd formation, the initial pH of the formed curd, and the pH of the cooked curd.

Table

| Example | Dione | Concentration Dione-PBW | Reaction Time-Minutes | pH-Cut Curd | pH-Cooked Curd |
|---|---|---|---|---|---|
| 5 | Glyoxal | 0.08 | 120 | 4.84 | 4.42 |
| 6 | Pyruvaldehyde | 0.10 | 45 | 4.77 | 4.44 |
| 7 | Diacetyl | 0.12 | 42 | 4.76 | 4.54 |
| 8 | 2,3-Pentanedione | 0.15 | 30 | 4.85 | 4.64 |
| 9 | 1,2-Cyclohexanedione | 0.20 | 120 | 4.85 | 4.56 |

EXAMPLE 10

A solution is prepared by combining 440 g. of 40 percent aqueous glyoxal and 681 g. of 75 percent phosphoric acid. This clear, colorless solution is added with stirring to a 60-gallon tank containing 45 gallons (176 kg.) of refrigerated skim milk (pH of 6.6). The concentration of acid in the milk is 0.29 parts by weight per 100 parts by weight of milk; that of glyoxal is 0.10 parts by weight per 100 parts by weight of milk. With addition of the glyoxal-acid solution, the pH of the milk decreases almost instantly to 5.28, whereupon 40 gallons (157 kg.) of this milk is pumped to a jacketed cheese vat. With continued agitation, the milk is heated to 30°–31° C., and 995 g. of 30 percent hydrogen peroxide (0.19 parts by weight H₂O₂ per 100 parts by weight of milk) is added. The milk mixture is then maintained without agitation at 30°–31° C. for approximately 2½ hours. The firm, smooth coagulum which forms is cut, cooked and washed in the usual manner. The finished cheese curds have excellent texture with no objectional odor, color or taste.

This example illustrates that acid and dione components may be employed as a premixed solution in the process of this invention with excellent results.

EXAMPLE 11

A reconstituted skim milk is prepared by stirring 91.7 g. of a commercial (96%) nonfat dry milk powder into 908 ml. of tap water. The prepared milk (8.8 percent solids) is stored in the refrigerator for 15–16 hours. It has a pH of 6.68.

The cold milk is then heated to 31° C. in a water bath, and 5.0 g. of 40 percent glyoxal (0.20 parts by weight glyoxal per 100 parts by weight of milk) and 6.0 g. 30 percent hydrogen peroxide (0.18 parts by weight H₂O₂ per 100 parts by weight of milk) are added. While the milk is then maintained at 31° C. without stirring for about 2 hours, the pH decreases to 4.70. A firm curd forms. After processing the curd as previously described, the drained curds are similar in texture and other characteristics to the products of the previous examples. The pH of the finished curds is 4.33.

EXAMPLE 12

This example illustrates the preparation of cream cheese according to this invention.

In a one-liter stainless steel beaker 330 g. of whipping cream (36% butterfat) and 735 g. 0.5 percent fat skim milk are weighed and mixed, yielding 1065 g. of milk with a butterfat content of 11.5 percent and a pH of 6.5. After heating the milk to approximately 29.5° C., 6.3 g. 40% glyoxal (0.24 parts by weight glyoxal per 100 parts by weight of milk) and 6.3 g 30% hydrogen peroxide (0.18 parts by weight H₂O₂ per 100 parts by weight of milk) are added with stirring. The milk-acidogen mixture is then maintained at 32°–34° C. for two hours in a quiescent state while firm, heavy curd forms. The pH is 4.76. Stirring of the curd mixture is begun and heat is applied. When the temperature of the curd mixture reaches 54°–55° C., it is maintained (cooked) at this temperature for 15 minutes, and then cooled. The pH of the cooled mixture is 4.41.

The curd mixture is poured into a filter assembly and drained overnight in a refrigerator. The pH of the drained curds is 4.42.

The separated curd is blended into a smooth homogeneous mass which has the taste, odor, color and texture of a good quality cream cheese.

I claim:

1. In a process for preparing a cheese product wherein milk in the absence of any milk-acidifying bacteria culture is acidified with the aid of a chemical acidogen to a pH at which milk protein is coagulated to stable cheese curd which is then processed to the finished product, the improvement which comprises employing as the chemical acidogen, at least one aliphatic $C_{2-6}$ dione in combination with hydrogen peroxide, said $C_{2-6}$ dione having vicinal carbonyl groups and conforming to one of the structures:

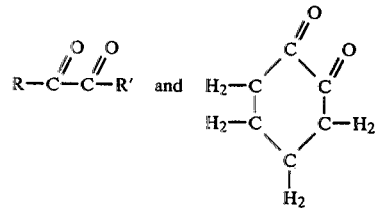

wherein R and R' are each hydrogen or $C_{1-2}$ alkyl.

2. The process of claim 1 wherein the dione is glyoxal, pyruvaldehyde, diacetyl, 2,3-pentanedione or 1,2-cyclohexanedione.

3. The process of claim 1 wherein from 0.05 to 0.50 parts by weight of dione and from 0.10 to 0.50 parts by weight of hydrogen peroxide are used, per 100 parts by weight of milk.

4. The process of claim 1 wherein coagulation is conducted at a temperature of 4°–40° C. for a time period of 0.5–24 hours.

5. The process of claim 1 wherein coagulation is conducted at a temperature of 28°–35° C. for a time period of 1–2 hours.

6. A process for preparing a cheese product which comprises maintaining at a temperature of 4°–40° C. milk containing a maximum of 20 percent butterfat in contact with an acidogen system containing from about 0.05 to 0.50 parts by weight of an aliphatic $C_{2-6}$ dione and from about 0.10 to 0.50 parts by weight of hydrogen peroxide, per 100 parts by weight of milk, said dione having vicinal carbonyl groups and conforming to one of the structures:

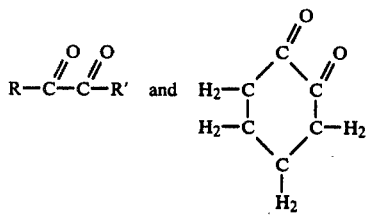

wherein R and R' are each hydrogen or $C_{1-2}$ alkyl; continuing to maintain the milk at said temperature in a quiescent state until acid generated therein from oxidation of the dione lowers the pH of the milk to the point at which protein in the milk is coagulated to a cuttable curd; and finally isolating and processing the curd to a finished cheese product.

7. The process of claim 6 wherein a food-grade free acid is incorporated into the milk to effect partial acidification thereof prior to adding the acidogen system.

8. The process of claim 7 wherein a mixture of a food grade free acid and one component of the acidogen system is incorporated into the milk prior to adding the second component of the acidogen system.

9. The process of claim 7 wherein the food-grade acid is phosphoric acid.

10. The process of claim 6 wherein the dione is glyoxal.

11. The process of claim 6 wherein the dione is pyruvaldehyde.

12. The process of claim 6 wherein the dione is diacetyl.

13. The process of claim 6 wherein the cheese product is cottage cheese.

14. The process of claim 6 wherein the cheese product is cream cheese.

UNITED STATES PATENT OFFICE
CERTIFICATE OF CORRECTION

PATENT NO. : 4,199,609
DATED : April 22, 1980
INVENTOR(S) : Fred L. Metz

It is certified that error appears in the above-identified patent and that said Letters Patent are hereby corrected as shown below:

Abstract, line 7, "case in" should read -- casein -- .

Column 3, line 61, "good" should read -- food -- .

Column 6, line 11, "366 g" should read -- 336 g -- .

Signed and Sealed this

Twelfth Day of August 1980

[SEAL]

Attest:

Attesting Officer

SIDNEY A. DIAMOND

Commissioner of Patents and Trademarks